Feb. 26, 1957     H. KUMP ET AL     2,782,880
AUTOMATIC SLACK ADJUSTER FOR RAILWAY BRAKE RIGGING
Filed Oct. 3, 1952     3 Sheets-Sheet 1
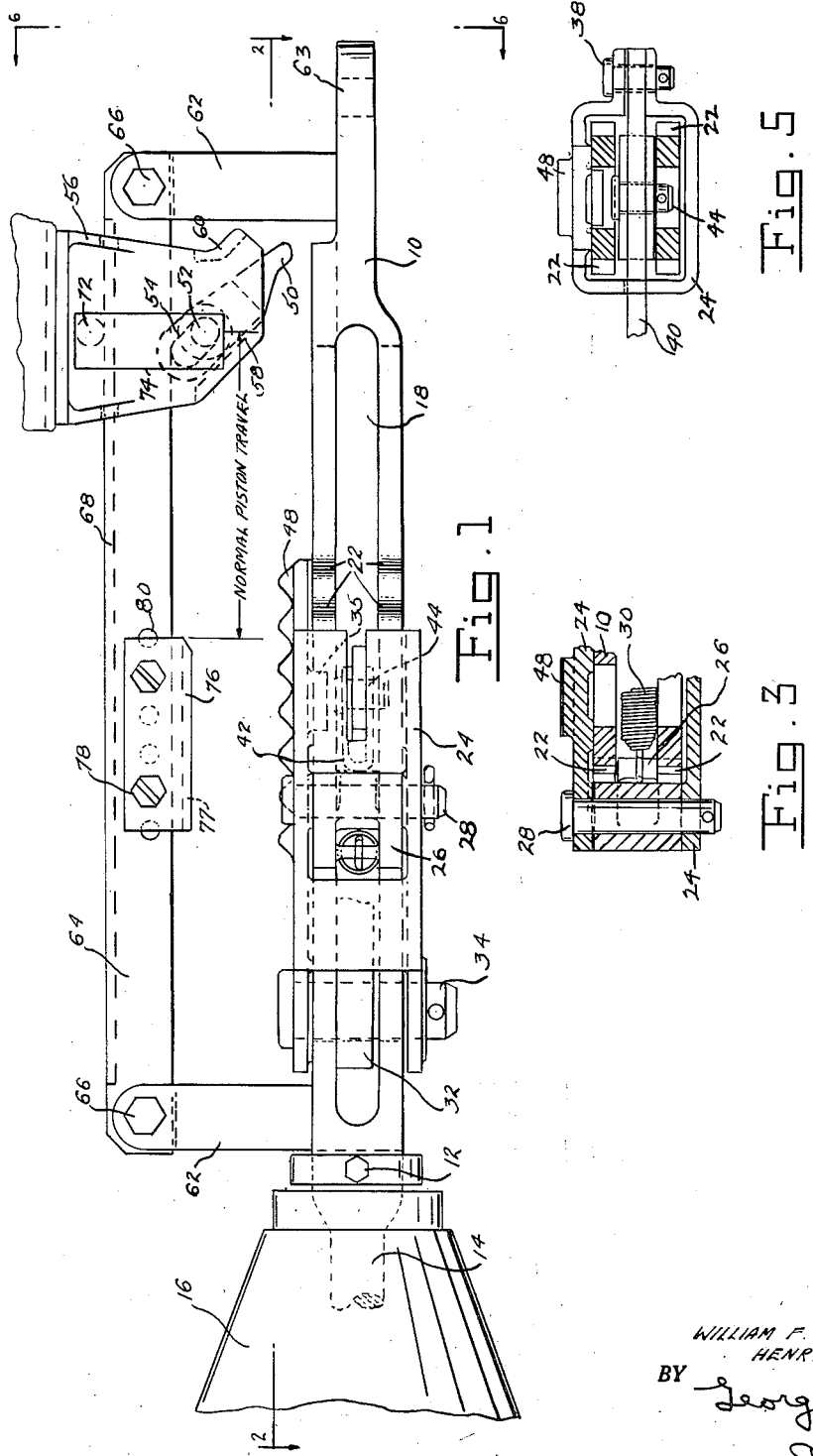
INVENTORS
WILLIAM F. DIETRICHSON
HENRY KUMP
BY George R. Ericson
Attorney

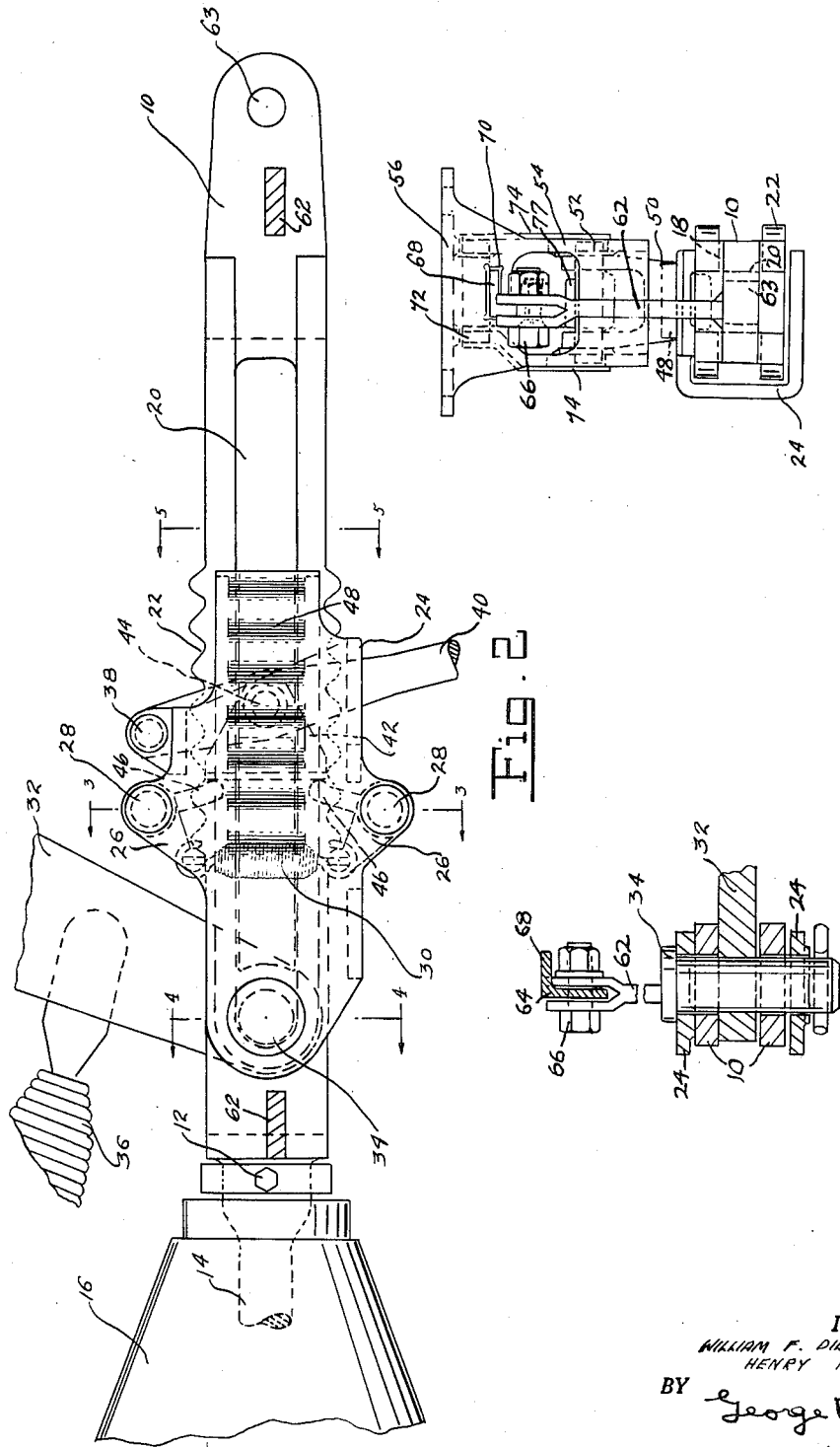

Feb. 26, 1957 H. KUMP ET AL 2,782,880
AUTOMATIC SLACK ADJUSTER FOR RAILWAY BRAKE RIGGING
Filed Oct. 3, 1952 3 Sheets-Sheet 3
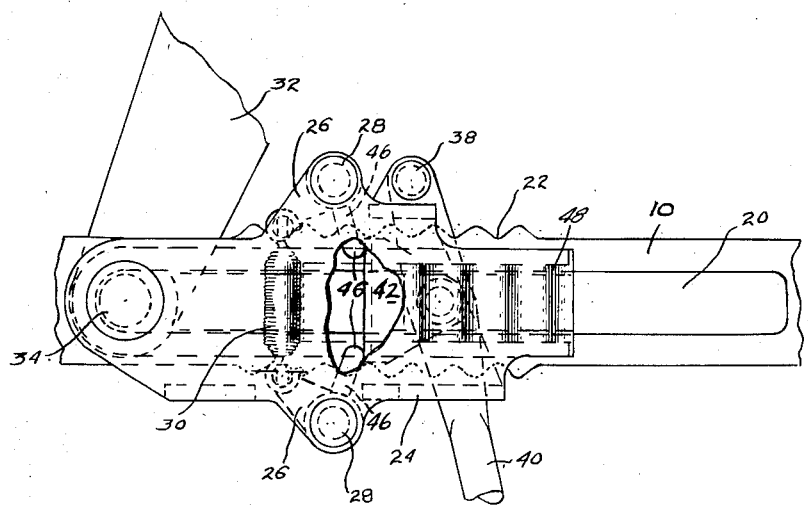
INVENTORS
WILLIAM F. DIETRICHSON
HENRY KUMP
BY George R. Ericson
Attorney

United States Patent Office 2,782,880
Patented Feb. 26, 1957

2,782,880

AUTOMATIC SLACK ADJUSTER FOR RAILWAY BRAKE RIGGING

Henry Kump, Berwick, Pa., and William F. Dietrichson, Garden City, N. Y., assignors to American Car and Foundry Company, New York, N. Y., a corporation of New Jersey Application October 3, 1952, Serial No. 313,006

12 Claims. (Cl. 188—200)

This invention relates to an improved automatic slack adjuster for railway car brake rigging of the type in which excess slack in the rigging due to brake shoe wear is taken up by shifting the fulcrum of a brake lever. Shifting of the lever fulcrum restores the proper clearance between the worn brake shoes and the wheels, which permits full application of the brakes with normal travel of the cylinder piston.

Present devices of this type are generally not fully automatic and in many cases require the use of complicated mechanisms for their operation. Such devices also usually comprise many parts, most of which are not easily accessible for inspection, cleaning, repair or replacement.

It is an object of the present invention to provide a fully automatic slack adjuster for railway brakes comprising relatively few parts and in which the use of complicated mechanisms for its operation has been eliminated.

Another object of the invention is to provide a slack adjuster as described which is self-contained and compact in construction and in which the parts are readily accessible for inspection, cleaning and repair.

These and other objects of the invention will be apparent to those skilled in the art from a study of the following description taken with the accompanying drawings, in which:

Fig. 1 is a side elevational view of the automatic brake slack adjuster of the present invention showing the same in retracted or normal position;

Fig. 2 is a top plan view of the device taken on line 2—2 of Fig. 1;

Fig. 3 is a partial transverse sectional view taken along the line 3—3 of Fig. 2 showing the left-hand side and part of the central portion of the device looking in the direction indicated by the arrows;

Fig. 4 is a cross sectional view of the device taken on line 4—4 of Fig. 2;

Fig. 5 is a transverse sectional view taken on line 5—5 of Fig. 2;

Fig. 6 is an end view of the device taken on line 6—6 of Fig. 1;

Fig. 7 is a fragmentary top plan view similar to Fig. 2, but showing the device in adjusted position, and, Fig. 8 is a side elevational view similar to Fig. 1, but showing the relative positions of the parts of the device during adjustment.

Referring now more in detail to the drawings, the brake slack adjuster device comprises a cylinder push rod 10 connected by bolt 12 to the piston 14 of the air brake cylinder 16. The cylinder push rod 10 is formed with an elongated horizontal slot 18, as shown in Fig. 1, an elongated vertical slot 20, as shown in Fig. 2, and a double series of notches 22 at opposite sides thereof above and below the horizontal slot 18. A shiftable cylinder or brake lever fulcrum sleeve 24 is adjustably locked on the push rod 10 by means of bell-crank detent members 26 pivotally carried by pins 28 at opposite sides of the sleeve. The detent members are held in releasable engagement with oppositely disposed notches 22, depending on the position of the sleeve relative to the push rod, by a suitable tension spring 30 connecting them through the horizontal slot 18 of the push rod. The end of the brake or cylinder lever 32 extends into the horizontal slot 18 and is pivotally connected to the fulcrum sleeve 24 by a pin 34 extending through the vertical slot 20 of the push rod. As will be seen, the cylinder lever is guided by the horizontal slot 18, while the fulcrum sleeve 24 is guided in the vertical slot 20 of the push rod. A lug 35 projects into the vertical slot 20 from the sleeve to additionally guide the latter on the push rod.

A coil or other suitable tension spring 36 fixed to the car structure acts to constantly urge the cylinder lever 32, and consequently also the fulcrum sleeve 24, toward retracted position at the ends of the slots 18, 20 in the push rod 10. The push rod is returned with piston 14 to retracted or normal position after each stroke following application of the brakes by a spring (not shown) provided with the cylinder 16. Pivotally connected by a pin 38 to one side of the fulcrum sleeve and extending through the horizontal slot 18 of the push rod is a release lever or handle 40. An equalizer member 42 is pivoted by a pin 44 to the lever 40 in position to engage the arms 46 of the bell-cranks 26 upon operation of the lever. It will be seen that by turning the lever 40 clockwise as viewed in Figs. 2 and 7, the bell-crank detents 26 will be swung out of engagement with the notches 22, releasing the fulcrum sleeve 24 from any adjusted position on the push rod for return to its initial position when new brake shoes are to be installed.

The fulcrum sleeve 24 is provided on its top with a longitudinally extending rack 48 which is engaged by a latch member 50 when the push rod 10 travels a predetermined distance beyond its normal stroke due to brake shoe wear. Engagement of the rack with the latch member prevents movement of the sleeve 24 whereby the latter is shifted to adjusted position as hereinafter to be described. The latch member 50 is generally U-shaped, as more clearly shown in Fig. 6, and journalled on a roller 52 mounted to ride in inclined slots 54 formed in opposite walls of a housing 56 fixed to the car underframe. The latch member is normally maintained in an inclined position by a stop 58 in the housing, its swinging movement being limited by said stop 58 and another stop 60 provided in the housing 56. The latch member is thus free to swing between the stops 58, 60 and is also liftably mounted in the housing, as indicated in Figs. 1 and 8, since it is carried by the roller 52 slidably supported in the slots 54. Posts 62 are rigidly secured to the cylinder push rod 10 adjacent each end thereof, the forward end of the push rod having a hole 63 therein for connection thereto of hand brake mechanism. The posts support an angle bar 64 extending through the housing and connected at its ends by bolts 66 to the upper ends of the posts. The angle bar 64 is slidably supported in the housing by arrangement of its leg 68 in openings 70 and in turn supports the push rod 10 at its forward end to prevent binding of the piston 14 in the cylinder 16. An antifriction roller 72 journalled in opposite walls of the housing engages the leg 68 of angle bar 64, both of the rollers 72 and 52 being retained in place by plates 74 tackwelded or otherwise secured to the housing walls. An angle-shaped latch keeper having legs 76, 77 is adjustably secured to the angle bar 64 by bolts 78 passing through the leg 76 and the proper holes 80 in the bar according to the length of the normal stroke of the push rod, as indicated in Fig. 1.

The device as shown in Figs. 1 and 2 is in normal retracted position with the detend members 26 engaged in the first notches 22 on the push rod. The fulcrum sleeve 24 may thus be considered as in its initial position, which is the case when the brake shoes are new. As the shoes wear with successive applications of the brakes, the length of the stroke of the push rod 10 increases proportionately beyond its normal length indicated in Fig. 1. The forward end of rack 48 on fulcrum sleeve 24 will eventually engage the latch member 50, which is free to swing and be lifted in the housing 56 by riding upon the rack until such time as the leg 77 of latch keeper 76 and leg 68 of angle bar 64 wedgingly engage between the rollers 52, 72. This prevents lifting of the latch member by the rack, but meanwhile the latter has advanced to a position where the latch member 50 is engaged in the first or most forward notch thereof, as clearly shown in Fig. 8. During the initial portion of the return stroke of the push rod 10, the latch member has been swung clockwise as viewed in Fig. 8 against the stop 58 in housing 56. The rack 48 is thus rigidly engaged by the latch member, preventing movement of the fulcrum sleeve 24 during continuance of the initial portion of the return stroke of the push rod 10 whereby it is shifted to adjusted position, as shown in Fig. 7, with the detents 26 engaged in the second notches on the push rod. By the time this has occurred, the latch keeper 76 will have cleared or become disengaged from the roller 52, permitting the latch member to be lifted upon further movement of the fulcrum sleeve with the push rod out of engagement with the rack.

Shifting of the sleeve 24 to adjusted position on the push rod 10 will, of course, also shift the fulcrum 34 of the cylinder lever 32 connected to it, restoring the proper clearance between the worn brake shoes and the wheels. Normal travel of the push rod, as indicated in Fig. 1, will also again prevail with the rack in advanced or adjusted position thereon and the latch member free to swing and be lifted in the housing 56 when engaged thereby during applications of the brakes. Further wear of the brake shoes will, of course, bring about a repetition of the events the same as previously described, except that the latch member will be engaged in the next or second notch of the rack to shift the fulcrum sleeve to a new adjusted position with the detents 26 engaged in the third notches on push rod 10.

It is believed clear from the foregoing description that a brake slack adjuster device has been provided which is fully automatic in operation and compact in construction. The slotted or open arrangement of the push rod renders the various parts of the device easily accessible for inspection, cleaning and maintenance. In addition, the slotted construction of the push rod provides self-contained means for guiding the cylinder lever and the lever fulcrum sleeve thereon, as well as permitting easy assembly and disassembly of the device.

The invention may be modified in various respects as will occur to those skilled in the art and the exclusive use of all modifications as come within the scope of the appended claims is contemplated.

What is claimed is:

1. An automatic slack adjuster for railway car brake rigging having a cylinder push rod comprising, a brake lever fulcrum member, yieldable interengaging means adjustably locking said fulcrum member on said cylinder push rod, a rack on said fulcrum member, a latch member liftably mounted on a fixed car part in position to slidably engage said rack when the fulcrum member is carried by the push rod beyond its normal path of movement due to excess slack in the brake rigging, and means carried by the cylinder push rod engageable with said latch member when the push rod travels a predetermined distance beyond its normal forward stroke for holding the latch member in rigid engagement with the rack to prevent movement of the fulcrum member during the initial portion of the return stroke of said push rod whereby said fulcrum member is shifted to adjusted position thereon prior to disengagement of said push rod carried means from said latch member.

2. In an automatic slack adjuster for the brake rigging of railway cars, a cylinder push rod formed with elongated slots therethrough at substantially right angles to each other, a brake lever fulcrum sleeve on said push rod, interengaging elements on said push rod and fulcrum sleeve, means extending through one of the slots in said push rod resiliently urging said elements into engagement to adjustably lock the fulcrum sleeve thereon, a brake lever extending into said one push rod slot, means extending through the other slot in the push rod pivotally connecting said brake lever to said fulcrum sleeve, a rack on said fulcrum sleeve, a latch member liftably mounted on a fixed car part in position to slidably engage said rack when the fulcrum sleeve is carried by the push rod beyond its normal path of movement due to excess slack in the brake rigging, and means carried by the cylinder push rod engageable with said latch member when the push rod travels a predetermined distance beyond its normal forward stroke for holding the latch member in rigid engagement with the rack to prevent movement of the fulcrum member during the initial portion of the return stroke of said push rod whereby said fulcrum member is shifted to adjusted position thereon prior to disengagement of said push rod carried means from said latch member.

3. In an automatic slack adjuster for the brake rigging of railway cars, a cylinder push rod formed with elongated slots therethrough at substantially right angles to each other, a brake lever fulcrum sleeve on said push rod, interengaging elements on said push rod and fulcrum sleeve, means extending through one of the slots in said push rod resiliently urging said elements into engagement to adjustably lock the fulcrum sleeve thereon, a brake lever extending into said one push rod slot, means extending through the other slot in the push rod pivotally connecting said brake lever to said fulcrum sleeve, a guide lug projecting from said fulcrum sleeve into said other push rod slot, a rack on said fulcrum sleeve, a latch member liftably mounted on a fixed car part in position to slidably engage said rack when the fulcrum sleeve is carried by the push rod beyond its normal path of movement due to excess slack in the brake rigging, and means carried by the cylinder push rod engageable with said latch member when the push rod travels a predetermined distance beyond its normal forward stroke for holding the latch member in rigid engagement with the rack to prevent movement of the fulcrum member during the initial portion of the return stroke of said push rod whereby said fulcrum member is shifted to adjusted position thereon prior to disengagement of said push rod carried means from said latch member.

4. In an automatic slack adjuster for the brake rigging of railway cars, a cylinder push rod formed with elongated slots therethrough at substantially right angles to each other, a brake lever fulcrum sleeve on said push rod, interengaging elements on said push rod and fulcrum sleeve, means extending through one of the slots in said push rod resiliently urging said elements into engagement to adjustably lock the fulcrum sleeve thereon, a brake lever extending into said one push rod slot, means extending through the other slot in the push rod pivotally connecting said brake lever to said fulcrum sleeve, means connected with said fulcrum sleeve and extending through said one push rod slot for manually disengaging said interengaged elements to release the fulcrum sleeve from said push rod, a rack on said fulcrum sleeve, a latch member liftably mounted on a fixed car part in position to slidably engage said rack when the fulcrum sleeve is carried by the push rod beyond its normal path of movement due to excess slack in the brake rigging, and means carried by the cylinder push rod engageable with said latch member when the push rod travels a predetermined distance beyond its normal forward stroke for holding the latch member in rigid engagement with the rack to prevent movement of the fulcrum member during the initial portion of the return stroke of said push rod whereby said fulcrum member is shifted to adjusted position thereon prior to disengagement of said push rod carried means from said latch member.

5. In an automatic slack adjuster for the brake rigging of railway cars, a cylinder push rod having horizontal and vertical elongated slots therethrough, said push rod being provided with a series of notches at opposite sides thereof, a brake lever fulcrum sleeve on said push rod, bell-crank detents pivotally carried by said fulcrum sleeve, a tension spring extending through the horizontal slot of said push rod forcing said detents into engagement with said notches to adjustably lock the fulcrum sleeve on the push rod, a brake lever extending into said horizontal push rod slot and guided thereby, a pin extending through the vertical slot of said push rod pivotally connecting the brake lever to said fulcrum sleeve and guiding the latter on the push rod, a hand lever pivotally connected with the fulcrum sleeve and extending through said horizontal push rod slot, an equalizer pivotally carried by said hand lever engageable with the bell-crank detents for swinging the same out of engagement with said notches to release the fulcrum sleeve from said push rod, and means for shifting the fulcrum sleeve to adjusted position on said push rod when the latter travels a predetermined distance beyond its normal forward stroke due to excess slack in the brake rigging to compensate therefor.

6. In an automatic slack adjuster for the brake rigging of railway cars having a cylinder push rod, a brake lever fulcrum member, yieldable interengaging means adjustably locking said fulcrum member on said cylinder push rod, a rack on said fulcrum member, a housing fixed on the car, a latch member liftably mounted in the housing in position to be slidably engaged by and disengaged from said rack when the fulcrum member is carried by the push rod beyond its normal path of movement due to excess slack in the brake rigging, said latch member being mounted in the housing for limited swinging movement in a direction toward said rack, and a latch keeper rigidly carried by the cylinder push rod adapted to wedgingly engage said latch member when the push rod travels a predetermined distance beyond its normal forward stroke for holding the latch member in rigid engagement with the rack to prevent movement of the fulcrum member during the initial portion of the return stroke of said push rod whereby said fulcrum member is shifted to adjusted position thereon prior to disengagement of said latch keeper from said latch member.

7. In an automatic slack adjuster for the brake rigging of railway cars having a cylinder push rod, a brake lever fulcrum member, yieldable interengaging means adjustably locking said fulcrum member on said cylinder push rod, a rack on said fulcrum member, a housing fixed on the car, a latch member liftably and pivotally mounted in the housing in position to be slidably engaged by and disengaged from said rack when the fulcrum member is carried by the push rod beyond its normal path of movement due to excess slack in the brake rigging, a stop in the housing for limiting pivotal movement of said latch member at least in a direction toward said rack, a bar rigidly carried by the cylinder push rod extending through and slidably supported in said housing, and a latch keeper on said bar adapted to wedgingly engage said latch member when the push rod travels a predetermined distance beyond its normal forward stroke for holding the latch member in rigid engagement with the rack to prevent movement of the fulcrum member during the initial portion of the return stroke of said push rod whereby said fulcrum member is shifted to adjusted position thereon prior to disengagement of said latch keeper from said latch member.

8. In an automatic slack adjuster for the brake rigging of railway cars having a cylinder push rod, a brake lever fulcrum member, yieldable interengaging means adjustably locking said fulcrum member on said cylinder push rod, a rack on said fulcrum member, a housing fixed on the car and formed with slots inclined downwardly and outwardly in a direction away from said rack, a latch member pivotally mounted in said inclined slots, a stop in the housing for limiting pivotal movement of said latch member beyond the inclination of said slots at least in a direction toward said rack, said latch member being in position to be slidably engaged and lifted in said slots by said rack when the fulcrum member is carried by the push rod beyond its normal path of movement due to excess slack in the brake rigging, and a latch keeper rigidly carried by the cylinder push rod adapted to wedgingly engage said latch member when the push rod travels a predetermined distance beyond its normal forward stroke for holding the latch member in rigid engagement with the rack to prevent movement of the fulcrum member during the initial portion of the return stroke of said push rod whereby said fulcrum member is shifted to adjusted position thereon prior to disengagement of said latch keeper from said latch member.

9. In an automatic slack adjuster for the brake rigging of railway cars having a cylinder push rod, a brake lever fulcrum member, yieldable interengaging means adjustably locking said fulcrum member on said cylinder push rod, a rack on said fulcrum member, a housing fixed on the car, a latch member liftably mounted in the housing in position to be slidably engaged and lifted by said rack when the fulcrum member is carried by the push rod beyond its normal path of movement due to excess slack in the brake rigging, said latch member being mounted in the housing for limited pivotal movement in a direction toward said rack, a post fixed adjacent each end of the cylinder push rod, a bar secured to the posts extending through and slidably supported by said housing and acting as a support for the outer end of the push rod, and a latch keeper on said bar adapted to wedgingly engage said latch member when the push rod travels a predetermined distance beyond its normal forward stroke for holding the latch member in rigid engagement with the rack to prevent movement of the fulcrum member during the initial portion of the return stroke of said push rod whereby said fulcrum member is shifted to adjusted position theron prior to disengagement of said latch keeper from said latch member.

10. In an automatic slack adjuster for the brake rigging of railway cars having a cylinder push rod, a brake lever fulcrum member, yieldable interengaging means adjustably locking said fulcrum member on said cylinder push rod, a rack on said fulcrum member, a housing fixed on the car, a latch member liftably mounted in the housing in position to be slidably engaged and lifted by said rack when the fulcrum member is carried by the push rod beyond its normal path of movement due to excess slack in the brake rigging, said latch member being mounted in the housing for limited pivotal movement in a direction toward said rack, an inverted U-shaped bar fixed to the cylinder push rod extending through and slidably supported in said housing, and a latch keeper adjustably carried by said bar adapted to wedgingly engage said latch member when the push rod travels a predetermined distance beyond its normal forward stroke for holding the latch member in rigid engagement with the rack to prevent movement of the fulcrum member during the initial portion of the return stroke of said push rod whereby said fulcrum member is shifted to adjusted position thereon prior to disengagement of said latch keeper from said latch member.

11. An automatic slack adjuster for railway car brake rigging having a cylinder push rod comprising, a brake lever fulcrum member, yieldable interengaging means adjustably locking said fulcrum member on said cylinder push rod, means shiftably mounted on a fixed car part in position to slidably engage said fulcrum member when the latter is carried by the push rod beyond its normal path of movement due to excess slack in the brake rigging, and means carried by said cylinder push rod engageable with said shiftably mounted means when the push rod travels a predetermined distance beyond its normal forward stroke for holding said shiftably mounted means in rigid engagement with the fulcrum member to prevent movement of the latter during the initial portion of the return stroke of said push rod whereby said fulcrum member is automatically shifted to adjusted position on the push rod prior to disengagement of said push rod carried means from said shiftably mounted means.

12. In a slack adjuster for railway car brake rigging having a cylinder push rod, a brake lever fulcrum member, yieldable interengaging means adjustably locking said fulcrum on said cylinder push rod, means for automatically adjusting the position of said brake lever fulcrum member on said push rod comprising shiftably mounted means on the car slidably engageably with said fulcrum member when the push rod travels beyond its normal forward stroke due to excess slack in the brake rigging, and means fixed to said push rod adapted to hold said shiftably mounted means rigidly engaged with the adjustable brake lever fulcrum member during the initial portion of the return stroke of said push rod.

References Cited in the file of this patent

UNITED STATES PATENTS

| | | |
|---|---|---|
| 635,988 | Wands | Oct. 31, 1899 |
| 1,749,018 | Campbell | Mar. 4, 1930 |
| 2,279,653 | Browall | Apr. 14, 1942 |
| 2,512,507 | Schroeder et al. | June 20, 1950 |